United States Patent Office 3,423,273
Patented Jan. 21, 1969

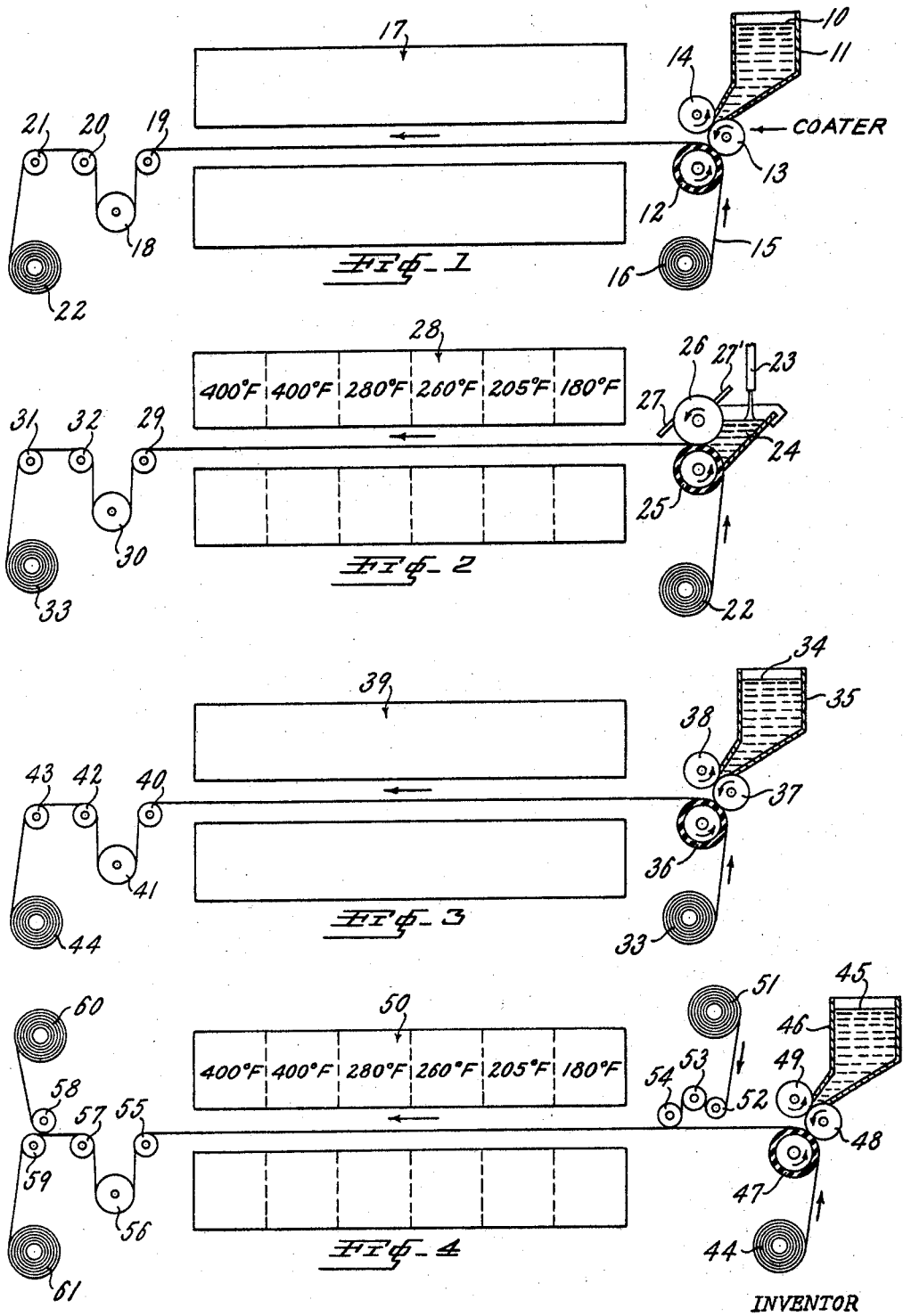

3,423,273
DECORATIVE LAMINATE AND METHOD OF MAKING THE SAME
Richard A. Mazur, Verona, Wis., assignor to Uniroyal, Inc., New York, N.Y., a corporation of New Jersey
Filed June 16, 1965, Ser. No. 464,462
U.S. Cl. 161—5     12 Claims
Int. Cl. B44f 1/00

ABSTRACT OF THE DISCLOSURE

A bright glossy coated fabric is achieved by casting a thin transparent surface layer, roll-over-roll casting a thin flitter containing layer with the flitter dimensions narrowly circumscribed between narrowly stated dimensional boundaries with the flitter being tilted at a multiplicity of angles relative to the surface of its layer and having interspersed therewith myriad areas in which a third opaque layer is fully visible through the flitter containing layer. A method is disclosed in which the product is produced by deaerating the transparent surface dispersion, deaerating the flitter mixture and casting the several layers. The flitter containing layer is roll-over-roll cast.

---

This invention relates to novel plastic films and to a method of making the same.

Supported and unsupported vinyl resin films are well-known and are widely used today. The films in question range in thickness from a maximum thickness of about .125″ for the heaviest fabric supported films down to about .003″ for the lightest unsupported films. Characteristically they have one highly decorative surface which is intended as the wear surface. The films are flexible, characterized by vinyl resins having at least 50 parts by weight of plasticizer per 100 parts of resin—the heaviest can be crushed quite readily in the hand—and can be readily draped and shaped as required for their intended applications. Films of this type are commonly called "simulated leathers" because their thickness, appearance, flexibility and suppleness suit them to many applications where they have replaced leather. Thus the films of the type contemplated by this invention are widely used in garments such as coats, jackets, gloves and mittens, in purses, in furniture and automotive upholstery, in automotive interior paneling, and the like.

This invention relates to novel supported and unsupported vinyl films having a unique decorative appearance on the wear surface side. It also relates to a method of making such films.

The films according to this invention comprise a transparent vinyl surface layer. Althrough this layer may have its outer surface embossed or smooth, it is characteristic of both the embossed and smooth embodiments that this surface layer is glossy and capable of reflecting highlights, and, of course, the smooth embodiments have a much higher sheen than the embossed embodiments.

Beneath this surface layer is disposed a second thin layer of transparent vinyl, somewhat heavier than the first, and containing opaque, light reflective metallic particles of the type which are known as "flitter." These particles are distributed so the particles are visible in every region of the layer when the latter is viewed in a direction normal to the surface of the film, but their distribution is not so dense as to render the layer opaque. Rather, myriad areas of "daylight" scattered throughout the layer can be seen through the two layers thus far described when viewed from this direction, i.e., no particle intercepts incident light rays in these areas, and although these areas so viewed are irregular in shape the major dimension of none is greater than about fifty times the largest dimension of the particles. The individual particles are oriented randomly within the layer, i.e., when viewed from the aforesaid direction various particles appear to be tilted at a multiplicity of various angles relative to the surface of the layer and to have angular protuberances whose projections in a plane of such surface point in a multiplicity of directions. When the layer is viewed from an edge, as in a cross-section through the layer, the random orientation can be seen to prevail throughout the thickness of the layer. The particles are arranged, and are present in sufficient quantity, to render the otherwise transparent layer translucent to the point that objects at a distance of 10 to 20 feet viewed through the two layers thus far described, and held not more than 2 or 3 inches from the eye, are visible in blurred outline, but surface features less than approximately an inch in dimension are indistinguishable except in blurred outline if displayed against a contrasting background. The layer next to be described is visible through the areas of "daylight" in the layer containing the particles.

An opaque layer is incorporated in the film beneath the layer containing the particles of flitter.

The film thus formed may be used in this condition, or it may be applied to a backing fabric using well-known techniques. Or additional backing layers, such as a heavy layer to give the fabric "body," or a sponge layer as disclosed in the copending application of Callum et al., Ser. No. 13,555, filed Mar. 8, 1960, now abandoned may be incorporated therein beneath the opaque layer depending upon the physical characteristics desired in the product.

Additional design effects can be achieved by printing "open" design patterns, i.e., patterns having significant unprinted areas in the design, on either side of the transparent surface layer, but preferably on the side next to the flitter containing layer, or by printing any desired design on the under surface of the fltter containing layer. Of course, if such last mentioned design is opaque, it may in some instances replace the previously referred to opaque layer.

In accordance with the method of this invention an unpigmented vinyl plastisol which is to form the surface layer is deaerated by placing the same in an open container in a closed chamber evacuated to 0.1 atmosphere for 20 minutes to remove air trapped therein. A flitter is provided consisting of metallic, preferably aluminum, flakes which have been prepared by chopping a thin metal sheet, colored with a desired color on one or both surfaces, to the requisite small particle size. The flakes have been depolarized to eliminate mutual inter attraction. Desirably, the metal sheet prior to chopping, is provided with a thin epoxy coating on both surfaces which decreases any tendency for the flakes to agglomerate when used in this invention. Flitter suitable for use in this invention is available under the names "Kingston" and "Bradford" from the Western Products Division of Mount Vernon Mills, Inc., Haverhill, Mass. The metal flakes are mixed in an unpigmented plastisol in a lightening mixer and the plastisol is thereafter deaerated by placing the same in an open container in a closed chamber evacuated to 0.1 atmosphere for 20 minutes to remove air trapped in the flitter containing plastisol.

The first mentioned deaerated unpigmented plastisol is coated on a casting surface in a thin layer, preferably by a reverse roller coater. This plastisol will form the glossy surface layer, hence the casting surface should be such as to produce a glossy surface on the layer. Conveniently the casting surface may be a paper surface which either may be embossed or may have a high gloss finish depending upon the surface desired in the finished film. This casting surface must be sufficiently smooth, even if embossed, to produce a film having a glossy surface capable of reflecting highlights. The paper carrying this plastisol layer is then passed through an oven to sodifify the same. Suitable casting papers are well-known. They consist of base webs of paper to which have been applied substances that give it a smooth hard surface, such as melamine, modified alkyls, varnish, nitrocellulose, lacquers, casein, glycerin, polyvinyl alcohol, shellac, etc. They may be embossed with a leather grain pattern which does not preclude achieving the desired glossy surface.

Preferably the surface layer plastisol is heated sufficiently to fuse the same. Next, the unpigmented flitter containing plastisol is applied over the surface layer on the casting surface. Significant advantages in the finished product are achieved if the flitter containing layer is applied in a roll-over-roll coater, for this minimizes any tendency toward aligning the flat flitter particles with their surfaces parallel to the surface of the plastisol layers. The paper then containing the two layers is passed through an oven where the flitter containing layer is heated sufficiently to fuse the same, and to fuse the two layers together.

A pigmented plastisol is next cast over the flitter containing layer, preferably by a reverse roll coater. The casting surface carrying the three layers is then passed into an oven where the last-mentioned pigmented layer is heated preferably to fuse the same.

For some applications the film may be considered complete at this point in which case the last pass through the oven must fuse any unfused layers, and must fuse the several layers together. The film can then be stripped from the casting surface.

Where a fabric backing is desired, it may be bonded to the thus-formed film after stripping from the carrier belt, but conveniently it is bonded to the film by applying the fabric to the freshly applied pigmented layer and just before it enters the oven to be solidified.

Desirably, however, the three layers thus far described are comparatively thin, and in that case a further body layer is applied over the pigmented layer. This body layer, which may contain a blowing agent as taught in the aforesaid Callum et al. application if desired, is applied over the pigmented layer when the latter is gelled but not completely fused. The body layer preferably is applied by a reverse roll coater in a substantial thickness, and the casting belt containing the four layers is then passed into an oven where any unfused layer is fused and the several layers are fused together. If a fabric backing is desired for the product it is pressed lightly into the body layer before the latter has been subjected to heat in the oven. If the body layer contains a blowing agent, the oven not only fuses the layer but decomposes the blowing agent and blows this layer.

The optional pattern prints referred to above may be applied in intermediate passes using well-known techniques. For example an "open" print may be printed from a conventional rotogravure printing roller on the gelled surface layer while the latter is carried on the casting surface. Similarly, a desired pattern may be printed on the flitter containing layer while the latter is carried with the surface layer on the casting surface by a rotogravure or other conventional printing roller.

For a better understanding of the nature of this invention reference should be had to the following detailed description of specific embodiments thereof when read in conjunction with the accompanying drawing wherein:

FIG. 1 is a schematic view illustrating the casting of the transparent surface layer by a reverse roll coater;

FIG. 2 is a schematic view illustrating the casting of the flitter containing layer by a roll-over-roll coater;

FIG. 3 is a schematic view illustrating the casting of the pigment containing layer over the previous two layers by a reverse roll coater, and FIG. 4 is a schematic view illustrating the casting of the body layer over the previous layers by a reverse roll coater, the application of a fabric backing and the stripping of the finished product from the casting belt.

Referring now to the drawings, an unpigmented plastisol 10 contained in the font 11 of a reverse roller coater having the usual back-up roll 12, applicator roll 13 and doctor roll 14 is cast onto a casting paper 15 supplied from a roll supply 16. The casting paper 15 containing the layer of clear plastisol next passes to an oven 17 where it is heated sufficiently to fuse the plastisol. Thereafter the casting paper containing this surface layer is directed to cooling roll 18 by a course directing roll 19, thence back to further course directing rolls 20 and 21 from which it advances to be wound into a roll 22.

The roll 22 is then transferred to a roll-over-roll coater such as that illustrated in FIG. 2. A flitter containing plastisol is pumped by a suitable pump, such as a Waukesha pump, through a 2 inch stainless steel feeder pipe 23 into the font 24 of the roll-over-roll coater which consists of the usual backup roll 25, applicator roll 26 and doctor knives 27, 27'. The casting paper from roll 22 is led over back-up roll 25 with the surface layer exposed, and a layer of flitter containing plastisol is applied over the surface layer by the roll-over-roll coater. The casting paper containing the two layers is then led to a zoned oven 28 having zones of increasing temperature to fuse the two plastisol layers and to fuse them together. The casting paper next passes over course changing roll 29, to a cooling roll 30, to course changing rolls 31 and 32 and, finally is wound into a roll 33 as illustrated.

The roll 33 is next transferred to the input of a reverse roll coater in which a pigmented plastisol 34 is contained in the font 35, and the usual back-up, applicator and doctor rollers 36, 37 and 38 of the reverse roll coater are present. The casting paper from the roll 33 is led over the back-up roller 36 with the flitter containing layer exposed so that pigmented plastisol from the font 35 is cast in a layer thereover. The casting paper containing the three layers next passes through on oven 39 where the pigmented layer is fused, thence to course changing roll 40, cooling roll 41, course changing rolls 42 and 43 and is wound up in a roll 44.

Roll 44 is next transferred to the input of a reverse roll coater having a body layer plastisol 45 in the font 46; the usual back-up, transfer and doctor rollers 47, 48 and 49 are present. The casting paper from the roll 44 is led over back-up roll 47 with the pigmented layer exposed to plastisol from the font 46 is cast in a thick body layer over the pigmented layer. If desired the plastisol 45 applied at this time may contain a suitable blowing agent. Thereafter the casting paper carrying the 4 layers passes to a fusing oven 50 where it is heated to fuse the last-applied layer and to fuse the several layers together. If a fabric backing is desired, a fabric from a roll 51 is led under an idler roll 52 and over a spreader roll 53 and, is then led under a laminating roller 54 with the casting paper containing the 4 layers. Since the fabric is applied to the body layer after the casting paper leaves the back-up roll 47 but before it enters the oven 50, the body layer plastisol is unfused, and the laminating roll 54 lightly presses the fabric into the still wet surface of the body layer plastisol.

If a blowing agent is contained in the last applied layer, it is also expanded during the pass through the oven 50. After leaving the oven 50, the casting paper passes over course directing roll 55, cooling roll 56 and course directing roll 57. It next passes to stripping rolls 58 and 59, at which point the finished film is removed from the casting paper 15 and wound into a roll 60 and the casting paper 15 is wound into a roll 61 for reuse.

The following specific example will further illustrate the invention.

EXAMPLE I

Plastisol I

| Ingredient: | Parts by weight |
|---|---|
| Polyvinylchloride, plastisol grade resin (Marvinol VR-50 brand) | 100 |
| Dioctylphthalate (plasticizer) | 30 |
| Dioctylazealate (plasticizer) | 12 |
| Epoxidized soy bean oil (plasticizer) | 10 |
| Stabilizer-phosphite type (Vanderbilt Vanstay SC brand) | 5 |
| Barium cadmium zinc stabilizer (Argus Chemical Co. Mark BB brand) | 2 |

Plastisol I, after being deaerated by placing a batch of the same in an open container in a closed chamber evacuated to 0.1 atmosphere vacuum for 20 minutes to remove the trapped air, is cast onto a casting paper, which may be embossed or flat as desired, by a reverse roll coater in a thickness of 3-4 mils. It next passes through an oven maintained at 380° F. for a dwell time of 3 minutes to fuse the plastisol.

Highly light reflective colored or natural aluminum flitters approximately .00045″ thick, .009″ wide and .015″ long, and carrying a very thin epoxy coating on both surfaces, are provided. The flitters flake may have a width in the range of .004″–.035″ and a length in the range of .004–.035″; their major dimension is in the range of about .004″ to about .035″ and their thickness is in the range of .00045″–.0008″.

Up to 15 parts, and preferably from 5 to 15 parts by weight of these flitters, per 100 parts of plastisol I, are mixed in a "lightening" mixer to thoroughly disperse the flitter in the plastisol. This flitter containing plastisol is deaerated by placing a batch of the same in an open container in a closed chamber evacuated to 0.1 atmosphere for 20 minutes to remove the trapped air.

The evacuated flitter containing plastisol is then pumped through pipe 23 to the roll-over-roll coater where a layer from 5 to 9 mils thick is applied over the surface layer. Thereafter the carrier paper containing the two layers passes through a six zone oven of equal length zones at gradually increasing temperatures of about 180° F., 205° F., 260° F., 280° F., 400° F. and 400° F. at a uniform rate for a total dwell time of 4 minutes during which the two layers are fused and fused together.

Plastisol II

| Ingredient: | Parts by weight |
|---|---|
| Polyvinylchloride resin, plastisol grade (Marvinol VR-50 brand) | 100 |
| Dioctylphthalate (plasticizer) | 70 |
| Stabilizer-phosphite type (Vanderbilt-Vanstay SC brand) | 2 |
| Calcium carbonate (filler) | 10 |
| Pigment (Phthalocyanine Blue or Copper Phthalocyanine—manufactured by E. I. du Pont de Nemours & Co.) | 10 |

From 3 to 7 mils thickness of plastisol II is applied by a reverse roller coater over the flitter containing layer. The casting paper then passes to an oven maintained at about 380° F. for a dwell time of about 4 minutes where this pigmented layer is fused.

Plastisol III

| Ingredient: | Parts by weight |
|---|---|
| Polyvinyl chloride resin, plastisol grade (Marvinol VR-53 brand) | 75 |
| Vinyl copolymer resin, 95% vinylchloride and 5% vinyl acetate (Pliovic AO brand) | 25 |
| brand) | 25 |
| Dioctylphthalate (plasticizer) | 92.5 |
| Aluminum stearate—1 part aluminum stearate, 7 parts dioctylphthalate (thickening agent) | 8 |
| Stabilizers [dibasic lead phthalate type 2.45 parts (Dythal brand), and lead orthosilicate gel type .613 parts by weight (Plumb-O-Sil)] | 3.063 |
| Blowing agent—azodicarbonamide (Celogen AZ brand) | 2.45 |
| Calcium carbonate (filler) | 30.0 |
| Pigment (Phthalocyanine Blue or Copper Phthalocyanine) | 8.0 |

An 11 to 15 mil layer of plastisol III is cast by reverse roller coater on to the pigmented layer, and a Jersey net knit fabric is applied to the exposed surface of this fourth layer while the latter is still wet.

The casting paper next passes to a six zoned oven maintained at gradually increasing temperatures of about 180° F., 205° F., 260° F., 280° F., 400° F., and 400° F. for a dwell time of 3 minutes where the pigmented layer and the layer containing the blowing agent are fused, the latter layer is expanded and the several layers are fused together. During this last mentioned heating, the layer containing the blowing agent has been expanded to a thickness of from 30 to 45 mls. Thereafter the supported film is stripped from the casting paper.

EXAMPLE II

A second embodiment consists in following Example I above but in addition applying to the back of the fused layer first-mentioned in Example I, a print pattern not over .0002″ thick and printed by rotogravure printing apparatus from the following ink:

Ink I

| Ingredient: | Parts by weight |
|---|---|
| Polyvinyl chloride resin, plastisol grade (Marvinol VR-53 brand) | 13 |
| Pigment (Ultramarine Blue) | 30 |
| Methylethyl ketone | 50 |
| Cyclohexanone | 10 |

This print pattern is dried in an oven at 300° F. during a 30 second dwell time before the flitter containing layer was applied, and Example I is otherwise repeated identically.

EXAMPLE III

Example III is the same as Example II except the rotogravure print pattern from ink I is applied to the back surface of the fused flitter containing layer, rather than to the back surface of the fused surface layer, and dried before the body layer is applied.

I claim:
1. A unitary, flexible, supple, decorative vinyl resin film not thicker than about .070″, said film having a glossy surface capable of reflecting highlights, said film including a transparent vinyl layer at said glossy surface, a thin flitter containing layer of transparent vinyl resin next to said surface layer, said flitter comprising highly light reflective colored particles of metal between about .00045″ and about .0008″ thick, said particles having a major dimension in the range from about .004″ to about .035″, there being less than about 15 parts by weight of said particles per 100 parts by weight of vinyl compound in said flitter containing layer, an opaque layer on the side of said flitter containing layer opposite from said surface layer, said flitter particles being distributed in said flitter containing layer such that when viewed from a direction normal to said glossy surface said particles are distributed throughout the facing area of said flitter containing layer and being arranged such that interspersed therewith throughout said facing area are myriad areas in which said opaque layer is visible through such flitter containing layer, the major dimension of none of said myriad areas being greater than about fifty times the largest dimension of said particles, said particles being tilted at a multiplicity of angles relative to the surface of the flitter containing layer and having angular protuberances whose projection in a plane of such surface point in a multiplicity of directions.

2. A vinyl film according to claim 1 including a supporting fabric backing affixed thereto at the face opposite said glossy surface.

3. A vinyl film according to claim 1 including a relatively thick body layer of vinyl resin on the side of such flitter containing layer opposite from said surface layer and in which there is from about 5 to about 15 parts by weight of said particles per 100 parts by weight of vinyl compound in said flitter containing layer.

4. A vinyl film according to claim 3 including a supporting fabric backing affixed thereto at the face opposite said glossy surface.

5. A vinyl film according to claim 3 wherein said body layer is an expanded layer of vinyl resin.

6. A vinyl film according to claim 4 including a supporting fabric backing affixed thereto at the face opposite said glossy surface.

7. A vinyl film according to claim 3 in which said flitter containing layer is at least twice as thick as said surface layer and in which said body layer is at least twice as thick as the combined thicknesses of said surface, flitter containing and opaque layers.

8. A vinyl film according to claim 7 including a supporting fabric backing affixed thereto at the face opposite said glossy surface.

9. A vinyl film according to claim 7 including a design pattern of vinyl between said surface and said flitter containing layer, said design pattern having substantial areas through which said flitter containing layer is visible.

10. A vinyl film according to claim 7 including a design pattern of vinyl on the side of such flitter containing layer opposite said surface layer.

11. A method of making a decorative vinyl film which comprises deaerating a transparent dispersion of vinyl resin and a plasticizer therefor, deaerating a mixture of flitters and a transparent dispersion of vinyl resin and a plasticizer therefor, casting a layer from the first mentioned transparent vinyl dispersion on a casting surface, casting a second layer from said mixture atop said first layer while the latter is still supported on said casting surface, casting a layer from an opaque dispersion of vinyl resin and a plasticizer therefor atop said flitter containing layer while the latter is still supported on said casting surface, and fusing the several layers into a unitary vinyl film.

12. A method according to claim 11 wherein said flitter containing layer is roll-over-roll cast.

References Cited

UNITED STATES PATENTS

| | | | |
|---|---|---|---|
| 3,235,399 | 2/1966 | Martin | 117—76 |
| 2,812,277 | 11/1957 | Hemming et al. | 161—93 |
| 2,813,052 | 11/1957 | Lancaster. | |
| 3,048,510 | 8/1962 | Wisotzky | 161—6 |
| 3,049,459 | 8/1962 | Smith et al. | 156—242 XR |
| 3,194,859 | 7/1965 | Wacker | 264—123 |
| 3,198,682 | 8/1965 | Hassel et al. | 156—298 |
| 3,265,548 | 8/1966 | Harkins et al. | 156—79 |
| 3,325,337 | 6/1967 | Harris | 161—5 |

FOREIGN PATENTS 923,207  4/1963  Great Britain.

JACOB H. STEINBERG, *Primary Examiner.*

W. A. POWELL, *Assistant Examiner.*

U.S. Cl. X.R.

161—6, 160, 413; 156—79, 219, 243, 246, 247, 277, 501; 264—45, 245, 299